US009406203B2

(12) United States Patent
Shai-Hee

(10) Patent No.: US 9,406,203 B2
(45) Date of Patent: Aug. 2, 2016

(54) GAMING SYSTEM AND A METHOD OF GAMING

(71) Applicant: Aristocrat Technologies Australia Pty Limited, North Ryde (AU)

(72) Inventor: Michael A. Shai-Hee, Kingsgrove (AU)

(73) Assignee: ARISTOCRAT TECHNOLOGIES AUSTRALIA PTY LIMITED, North Ryde (AU)

(*) Notice: Subject to any disclaimer, the term of this patent is extended or adjusted under 35 U.S.C. 154(b) by 252 days.

(21) Appl. No.: 14/104,638

(22) Filed: Dec. 12, 2013

(65) Prior Publication Data

US 2014/0106849 A1 Apr. 17, 2014

Related U.S. Application Data

(63) Continuation of application No. 12/325,889, filed on Dec. 1, 2008, now Pat. No. 8,632,389.

(30) Foreign Application Priority Data

Nov. 30, 2007 (AU) ................................ 2007906564

(51) Int. Cl.
*A63F 13/00* (2014.01)
*G07F 17/34* (2006.01)
*G07F 17/32* (2006.01)

(52) U.S. Cl.
CPC ............ *G07F 17/34* (2013.01); *G07F 17/3244* (2013.01); *G07F 17/3267* (2013.01)

(58) Field of Classification Search
CPC .... G07F 17/32; G07F 17/326; G07F 17/3267
USPC ........................................................... 463/20
See application file for complete search history.

(56) References Cited

U.S. PATENT DOCUMENTS 4,198,052 A 4/1980 Gauselmann
5,611,535 A 3/1997 Tiberio
5,989,121 A 11/1999 Sakamoto
7,014,560 B2 3/2006 Glavich et al.

(Continued)

FOREIGN PATENT DOCUMENTS

DE 3105266 9/1982
DE 4321833 1/1995

(Continued)

OTHER PUBLICATIONS

United States Patent and Trademark Office, "Notice of Allowance", issued in connection with U.S. Appl. No. 12/325,889, mailed on Sep. 16, 2013, 18 pages.

(Continued)

*Primary Examiner* — Allen Chan
(74) *Attorney, Agent, or Firm* — Armstrong Teasdale LLP

(57) ABSTRACT

A gaming system comprising a selector arranged to select a plurality of symbols from a set of symbols for display in a display area at a plurality of display positions and to select a plurality of win line elements. The gaming system is arranged to define a special win line when a plurality of win line elements are contiguously displayed across the display area, and an outcome generator arranged to determine a game outcome based on symbols displayed along the special win line if a special win line is defined. A corresponding method is also disclosed.

33 Claims, 11 Drawing Sheets

(56) References Cited

U.S. PATENT DOCUMENTS

| | | | | |
|---|---|---|---|---|
| 2002/0155881 | A1 | 10/2002 | Yoshida | |
| 2005/0170876 | A1* | 8/2005 | Masci | G07F 17/3267 463/16 |
| 2006/0040728 | A1* | 2/2006 | Fuller | G07F 17/34 463/20 |
| 2007/0026923 | A1* | 2/2007 | Muir | G07F 17/32 463/16 |
| 2007/0270208 | A1* | 11/2007 | Caspers | G07F 17/32 463/20 |
| 2009/0191949 | A1 | 7/2009 | Shai-Hee | |

FOREIGN PATENT DOCUMENTS

| | | |
|---|---|---|
| DE | 4439009 | 5/1996 |
| DE | 10150700 | 4/2003 |
| EP | 0373801 | 6/1990 |
| GB | 2170636 | 8/1986 |
| GB | 2182476 | 5/1987 |
| GB | 2328311 | 2/1999 |
| GB | 2387260 | 10/2003 |
| JP | 2003033524 | 2/2003 |
| JP | 2003265755 | 9/2003 |
| JP | 2003310942 | 11/2003 |
| JP | 2003340045 | 12/2003 |
| JP | 2004129679 | 4/2004 |
| JP | 2004154254 | 6/2004 |
| JP | 2005074062 | 3/2005 |
| JP | 2006006403 | 1/2006 |
| JP | 2006051261 | 2/2006 |
| JP | 2006204538 | 8/2006 |
| JP | 2006-346386 A † | 12/2006 |
| JP | 2006340926 | 12/2006 |
| WO | 2004036518 | 4/2004 |

OTHER PUBLICATIONS

United States Patent and Trademark Office, "Non-Final Office Action", issued in connection with U.S. Appl. No. 12/325,889, mailed on Jun. 12, 2013, 23 pages.

United States Patent and Trademark Office, "Final Office Action", issued in connection with U.S. Appl. No. 12/325,889, mailed on May 8, 2012, 24 pages.

United States Patent and Trademark Office, "Non-Final Office Action", issued in connection with U.S. Appl. No. 12/325,889, mailed on Jun. 24, 2011, 22 pages.

* cited by examiner
† cited by third party

GAMING SYSTEM AND A METHOD OF GAMING

CROSS-REFERENCE TO RELATED APPLICATIONS

The present application claims, as a continuation, the benefit of priority of U.S. patent application Ser. No. 12/325,889 filed on Dec. 1, 2008, which claims the benefit of priority to Australian Provisional Patent Application No. 2007906564, filed on Nov. 30, 2007, entitled “A GAMING SYSTEM AND A METHOD OF GAMING”, which is herein incorporated by reference in its entirety.

FIELD OF THE INVENTION

The present invention relates to a gaming system and to a method of gaming.

BACKGROUND OF THE INVENTION

It is known to provide a gaming system which comprises a game controller arranged to randomly display several symbols from a predetermined set of symbols and to determine a game outcome such as a game win based on the displayed symbols. Such gaming systems may commonly be implemented as a stepper machine provided with reels with each reel carrying several symbols of the set, or a video machine wherein selected symbols are displayed on virtual reels on a graphical display device.

However, while such gaming systems provide users with enjoyment, a need exists for alternative gaming systems in order to maintain or increase player enjoyment.

SUMMARY OF THE INVENTION

In accordance with a first aspect of the present invention, there is provided a gaming system including:

a selector arranged to select a plurality of symbols from a set of symbols for display in a display area at a plurality of display positions and to select a plurality of win line elements, the gaming system being arranged to define a special win line when a plurality of win line elements are contiguous across the display area; and an outcome generator arranged to determine a game outcome based on symbols displayed along the special win line if a special win line is defined.

In one embodiment, the plurality of win line elements are selected simultaneously. Alternatively, the win line elements are selected consecutively, or groups of win line elements are selected consecutively, such that the number of displayed win line elements progressively increases.

In one embodiment, each win line element is associated with a symbol such that selection of a symbol by the selector also effects selection of an associated win line element.

In an alternative embodiment, the selector includes a symbol selector and a win line elements selector such that the win line elements are selectable independently of selection of the symbols.

In one embodiment, the win line elements are always visible.

In an alternative embodiment, the gaming system is operable in normal game mode and special game mode, and win line elements are visible only during special game mode.

In one arrangement, during normal game mode, the selector is arranged to select a plurality of first symbols for display at a plurality of display positions, and after commencement of special game mode, the selector is arranged to select a plurality of second symbols for display at a plurality of display positions and to select a plurality of win line elements associated with the display positions.

In an embodiment wherein the win line elements are selectable independently of selection of the symbols, after commencement of special game mode, the selector may be arranged to select the symbols for display at the plurality of display positions and to subsequently select a plurality of win line elements associated with the display positions.

Alternatively, the selector may be arranged to select the plurality of win line elements associated with the display positions at the same time as selection of the symbols.

In one embodiment, each symbol has an associated win line element.

In one embodiment, when a special win line is defined by a plurality of win line elements, the special win line is emphasized to a player, for example by displaying an emphasized line extending along the defined special win line.

In one embodiment, a plurality of special win lines may be defined.

In one embodiment, the gaming system is arranged to commence special game mode when a trigger condition exists, which may be display of at least one trigger symbol, such as a wild symbol.

In an alternative embodiment, the trigger condition is display of a particular combination of trigger symbols such as scattered predefined symbols or a particular combination of adjacently disposed symbols along a win line.

The set of symbols may include at least one function symbol having an associated function which may be a wild function, a scatter function, a multiplier function, a repeat win function or a jackpot function.

The gaming system may be implemented as a stand alone gaming machine or across a network.

In accordance with a second aspect of the present invention, there is provided a method of gaming including:

selecting a plurality of symbols from a set of symbols for display in a display area at a plurality of display positions;

selecting a plurality of win line elements;

defining a special win line when a plurality of win line elements are contiguous across the display area; and determining a game outcome based on symbols displayed along the special win line if a special win line is defined.

In accordance with a third aspect of the present invention, there is provided a computer program arranged when loaded into a computer to instruct the computer to operate in accordance with a gaming system including:

a selector arranged to select a plurality of symbols from a set of symbols for display in a display area at a plurality of display positions and to select a plurality of win line elements, the gaming system being arranged to define a special win line when a plurality of win line elements are contiguous across the display area; and an outcome generator arranged to determine a game outcome based on symbols displayed along the special win line if a special win line is defined.

In accordance with a fourth aspect of the present invention, there is provided a computer readable medium having computer readable program code embodied therein for causing a computer to operate in accordance with a gaming system including:

a selector arranged to select a plurality of symbols from a set of symbols for display in a display area at a plurality of display positions and to select a plurality of win line elements, the gaming system being arranged to define a special win line when a plurality of win line elements are contiguous across the display area; and an outcome generator arranged to determine a game outcome based on symbols displayed along the special win line if a special win line is defined.

In accordance with a fifth aspect of the present invention, there is provided a data signal having computer readable program code embodied therein for causing a computer to operate in accordance with a gaming system including:

a selector arranged to select a plurality of symbols from a set of symbols for display in a display area at a plurality of display positions and to select a plurality of win line elements, the gaming system being arranged to define a special win line when a plurality of win line elements are contiguous across the display area; and an outcome generator arranged to determine a game outcome based on symbols displayed along the special win line if a special win line is defined.

BRIEF DESCRIPTION OF THE DRAWINGS

Certain embodiments of the present invention will now be described, by way of example only, with reference to the accompanying drawings, in which.

Figure 1:
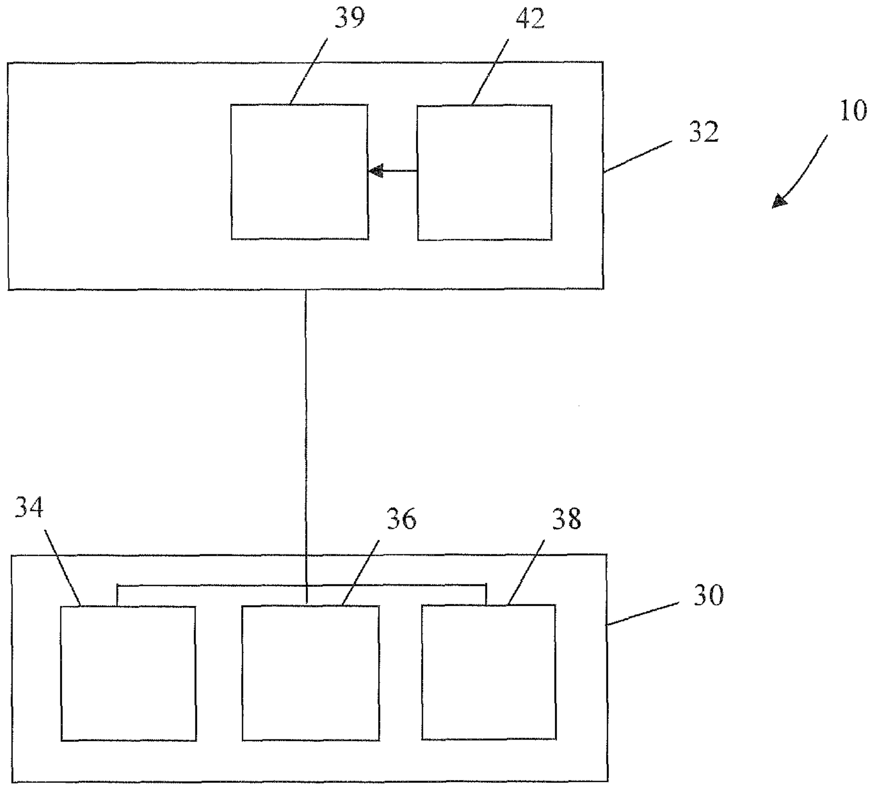
FIG. 1 is a schematic block diagram of core components of a gaming system in accordance with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DESCRIPTION OF CERTAIN EMBODIMENTS OF THE INVENTION

Referring to the drawings, there is shown a schematic block diagram of a gaming system 10 arranged to implement a probabilistic game of the type wherein several symbols from a set of symbols are randomly displayed, and a game outcome is determined on the basis of the displayed symbols. With some such probabilistic games, the set of symbols include standard symbols and function symbols, and the game outcome is determined on the basis of the displayed standard symbols and the function associated with any displayed function symbol. For example, standard symbols may resemble fruit such as apples, pears and bananas with a win outcome being determined when a predetermined number of the same fruit appear on a display in the same win line, scattered, and so on. The function associated with a function symbol may be for example a wild function wherein display of the function symbol is treated during consideration of the game outcome as any of the standard symbols. A function symbol may be represented as the word “WILD”, a star, or by any other suitable word or symbol. Other functions are also envisaged such as scatter functions, multiplier functions, repeat win functions, jackpot functions and feature commencement functions. The available win lines may be fixed, may be determined on the basis of the bet placed, or may be selectable by a player.

The present gaming system operates such that at least during a portion of a game implemented by the gaming system, at least one special win line in addition to one or more normal available win lines may be defined. This is achieved by displaying a win line element at at least some of the display positions, with each win line element defining a portion of a win line and defining a special win line when a plurality of win line portions are contiguous such that a continuous win line is defined across a display area by the win line elements. In this way, the player is provided with enhanced enjoyment and an increased likelihood of obtaining a winning outcome.

Referring to FIG. 1, a schematic diagram of core components of a gaming system 10 is shown. The core components include a player interface 30 and a game controller 32. The player interface 30 is arranged to enable interaction between a player and the gaming system and for this purpose includes input/output components for the player to enter instructions and play the game.

Components of the player interface 30 may vary but will typically include a credit mechanism 34 to enable a player to input credits and receive payouts, one or more displays 36 which may include a touch screen, and a game play mechanism 38 arranged to enable a player to input game playing instructions.

The game controller 32 is in data communication with the player interface 30 and typically includes a processor 39 arranged to process game play instructions and output game player outcomes to the display 36. Typically, the game play instructions are stored as program code in a memory 42 that can also be hardwired. It will be understood that in this specification the term "processor" is used to refer generically to any device that can process game play instructions and may include a microprocessor, microcontroller, programmable logic device or any computational device such as a personal computer or a server.

Figure 2:
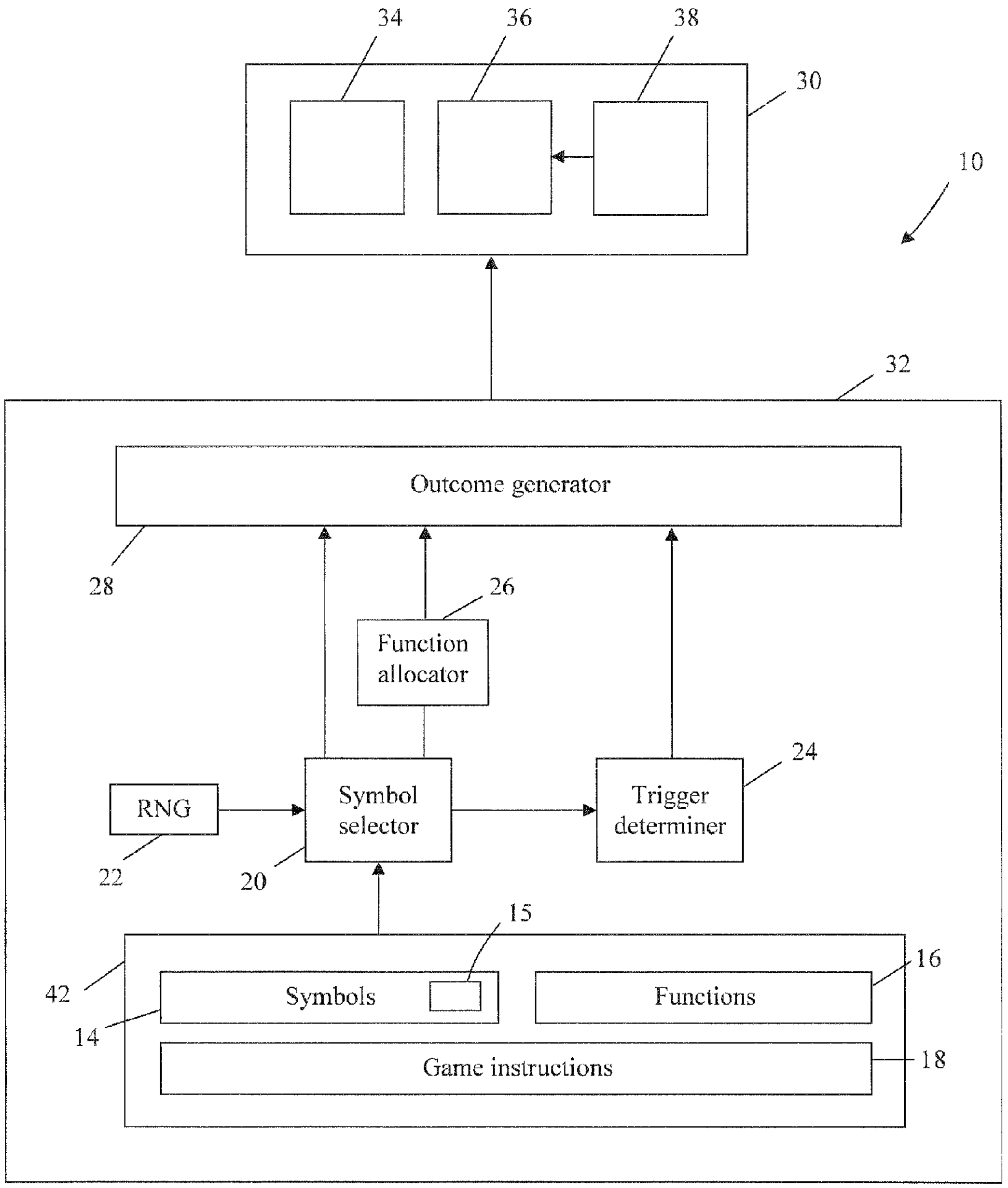
FIG. 2 is a schematic block diagram of functional components of a gaming system in accordance with an embodiment of the present invention.

A functional diagram illustrating operative components of the game controller 32 is shown in FIG. 2.

The memory 42 is arranged to store symbols data 14 indicative of a plurality of symbols for subsequent display to a player, function data 16 indicative of one or more functions allocatable to the symbols, and game instruction data 18 indicative of game instructions usable by the gaming machine 10 to control operation of the game.

The game controller 32 includes a symbol selector 20 which is arranged to select several symbols from the stored symbols 14 for display to a player. In this example, the selection carried out by the symbol selector 20 is made using a random number generator 22.

It will be appreciated that the random number generator 22 may be of a type which is arranged to generate pseudo random numbers based on a seed number, and that in this specification the term "random" will be understood accordingly to mean truly random or pseudo random.

In the present example, the symbols data 14 includes information indicative of symbol representations and information indicative of win line elements 15 associated with the symbol representations. In the present example, the gaming system 10 is operable in normal game mode and special game mode, and the win line elements are only displayed during special game mode. Special game mode may commence based on occurrence of a trigger condition.

The game controller 32 also includes a trigger determiner 24 arranged to determine whether a trigger condition exists to commence special game mode.

In this example, the game controller 32 also includes a function allocator 26 arranged to select and allocate one or more functions to one or more symbols. Such functions include a wild function, a scatter function, or any other function which may be applied to a symbol or to the game.

The game controller 32 also includes an outcome generator 28 which in accordance with the game instructions 18 determines game outcomes based on the symbols selected for display to a player by the symbol selector 20, and during special game mode if a special win line is defined by aligned win line elements, on the basis of symbols displayed along the special win line.

In the embodiments described below, the symbol selector 20, the trigger determiner 24, the function allocator 26, and the outcome generator 28 are at least partly implemented using the processor 39 and associated software, although it will be understood that other implementations are envisaged.

The gaming system 10 can take a number of different forms.

In a first form, a stand alone gaming machine is provided wherein all or most components for implementing the game are present in a player operable gaming machine.

In a second form, a distributed architecture is provided wherein some of the components for implementing the game are present in a player operable gaming machine and some of the components for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to play audible and/or display visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Figure 3:
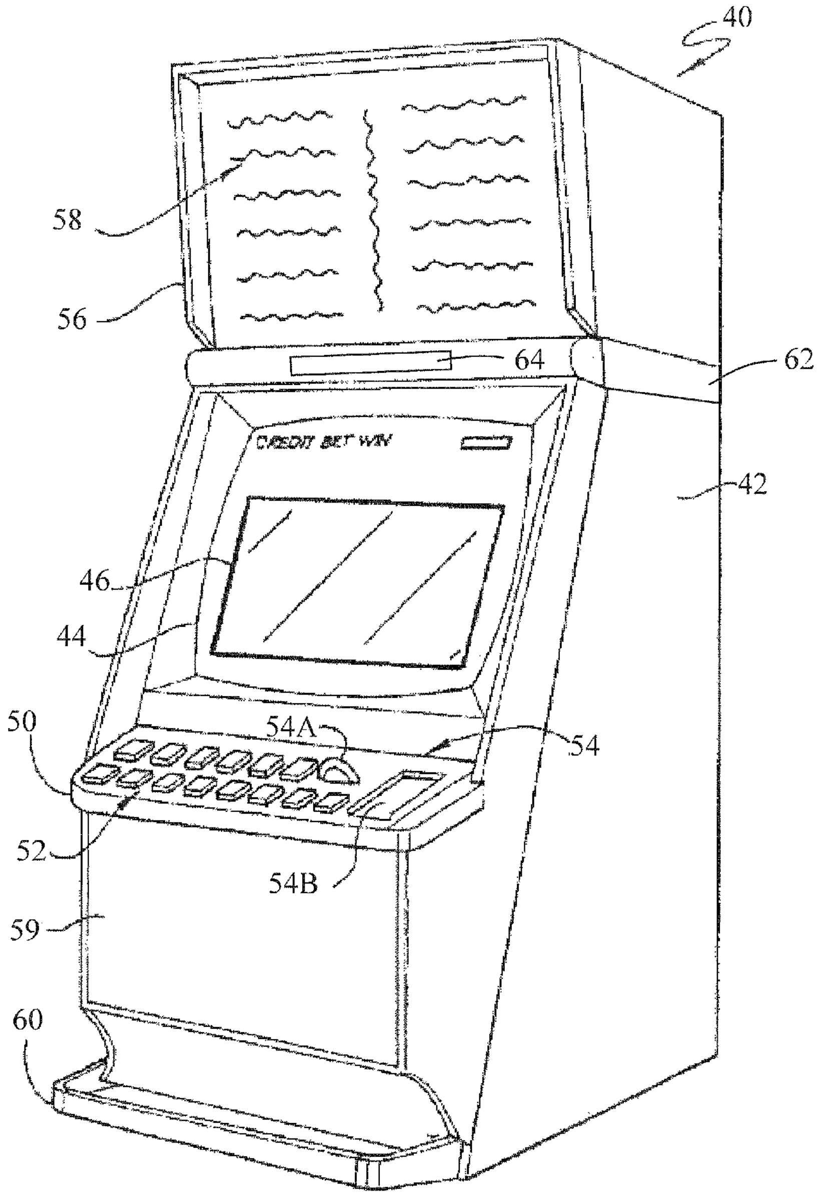
FIG. 3 is a diagrammatic representation of a gaming system in accordance with an embodiment of the present invention with the gaming system implemented in the form of a stand alone gaming machine.

A gaming system in the form of a stand alone gaming machine 40 is illustrated in FIG. 3. The gaming machine 40 includes a console 42 having a display 44 on which is displayed representations of a game 46 that can be played by a player. A mid-trim 50 of the gaming machine 40 houses a bank of buttons 52 for enabling a player to interact with the gaming machine, in particular during gameplay. The mid-trim 50 also houses a credit input mechanism 54 which in this example includes a coin input chute 54A and a bill collector 54B. Other credit input mechanisms may also be employed, for example, a card reader for reading a smart card, debit card or credit card.

A top box 56 may carry artwork 58, including for example pay tables and details of bonus awards and other information or images relating to the game. Further artwork and/or information may be provided on a front panel 59 of the console 42. A coin tray 60 is mounted beneath the front panel 59 for dispensing cash payouts from the gaming machine 40.

The display 44 is in the form of a video display unit, particularly a cathode ray tube screen device. Alternatively, the display 44 may be a liquid crystal display, plasma screen, or any other suitable video display unit. The top box 56 may also include a display, for example a video display unit, which may be of the same type as the display 44, or of a different type.

The display 44 in this example is arranged to display representations of several reels, each reel of which has several associated symbols. Typically 3, 4 or 5 reels are provided. During operation of the game, the reels first appear to rotate then stop with typically three symbols visible on each reel.

A player marketing module (PMM) 62 having a display 64 is connected to the gaming machine 10. The main purpose of the PMM 62 is to allow the player to interact with a player loyalty system. The PMM has a magnetic card reader for the purpose of reading a player tracking device, for example as part of a loyalty program. However other reading devices may be employed and the player tracking device may be in the form of a card, flash drive or any other portable storage medium capable of being read by the reading device. In this example, the PMM 62 is a Sentinel III device produced by Aristocrat Technologies Pty Ltd.

Figure 4:
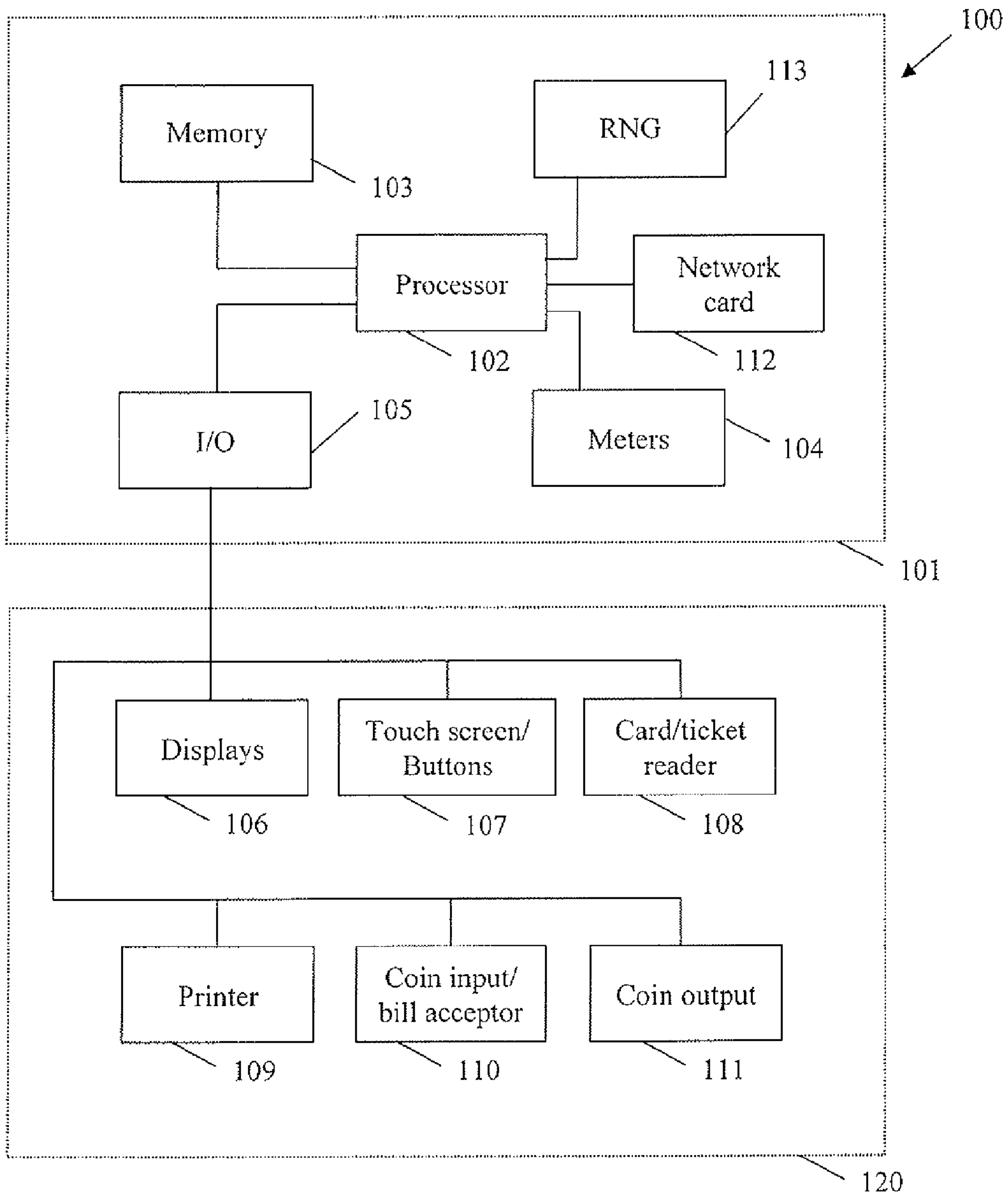
FIG. 4 is a schematic block diagram of operative components of the gaming machine shown in FIG. 3.

FIG. 4 shows a block diagram of operative components of a typical gaming machine 100 which may be the same as or different to the gaming machine shown in FIG. 3.

The gaming machine 100 includes a game controller 101 having a processor 102. Instructions and data to control operation of the processor 102 in accordance with the present invention are stored in a memory 103 which is in data communication with the processor 102.

Typically, the gaming machine 100 will include both volatile and non-volatile memory and more than one of each type of memory, with such memories being collectively represented by the memory 103.

Figure 5:
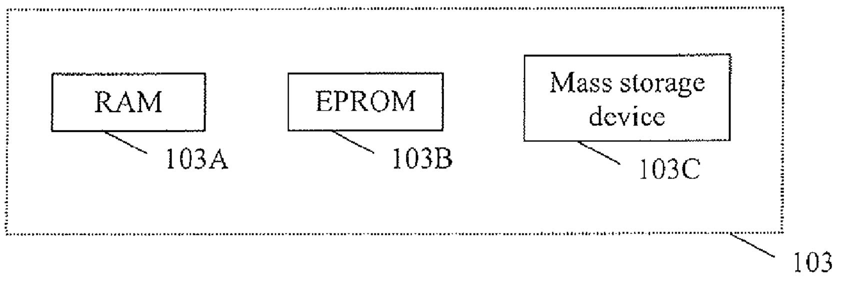
FIG. 5 is a schematic block diagram of components of a memory of the gaming machine shown in FIG. 3.

FIG. 5 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

The gaming machine has hardware meters 104 for purposes including ensuring regulatory compliance and monitoring player credit, an input/output (I/O) interface 105 for communicating with a player interface 120 of the gaming machine 100, the player interface 120 having several peripheral devices. The input/output interface 105 and/or the peripheral devices may be intelligent devices with their own memory for storing associated instructions and data for use with the input/output interface or the peripheral devices. A random number generator module 113 generates random numbers for use by the processor 102.

In the example shown in FIG. 4, the peripheral devices that communicate with the game controller 101 include one or more displays 106, a touch screen and/or bank of buttons 107, a card and/or ticket reader 108, a printer 109, a bill acceptor and/or coin input mechanism 110 and a coin output mechanism 111. Additional hardware may be included as part of the gaming machine 100, or hardware may be omitted based on the specific implementation.

In addition, the gaming machine 100 may include a communications interface, for example a network card 112. The network card may, for example, send status information, accounting information or other information to a central controller, server or database and receive data or commands from the central controller, server or database.

It is also possible for the operative components of the gaming machine 100 to be distributed, for example input/output devices 106,107,108,109,110,111 may be provided remotely from the game controller 101.

Figure 6:
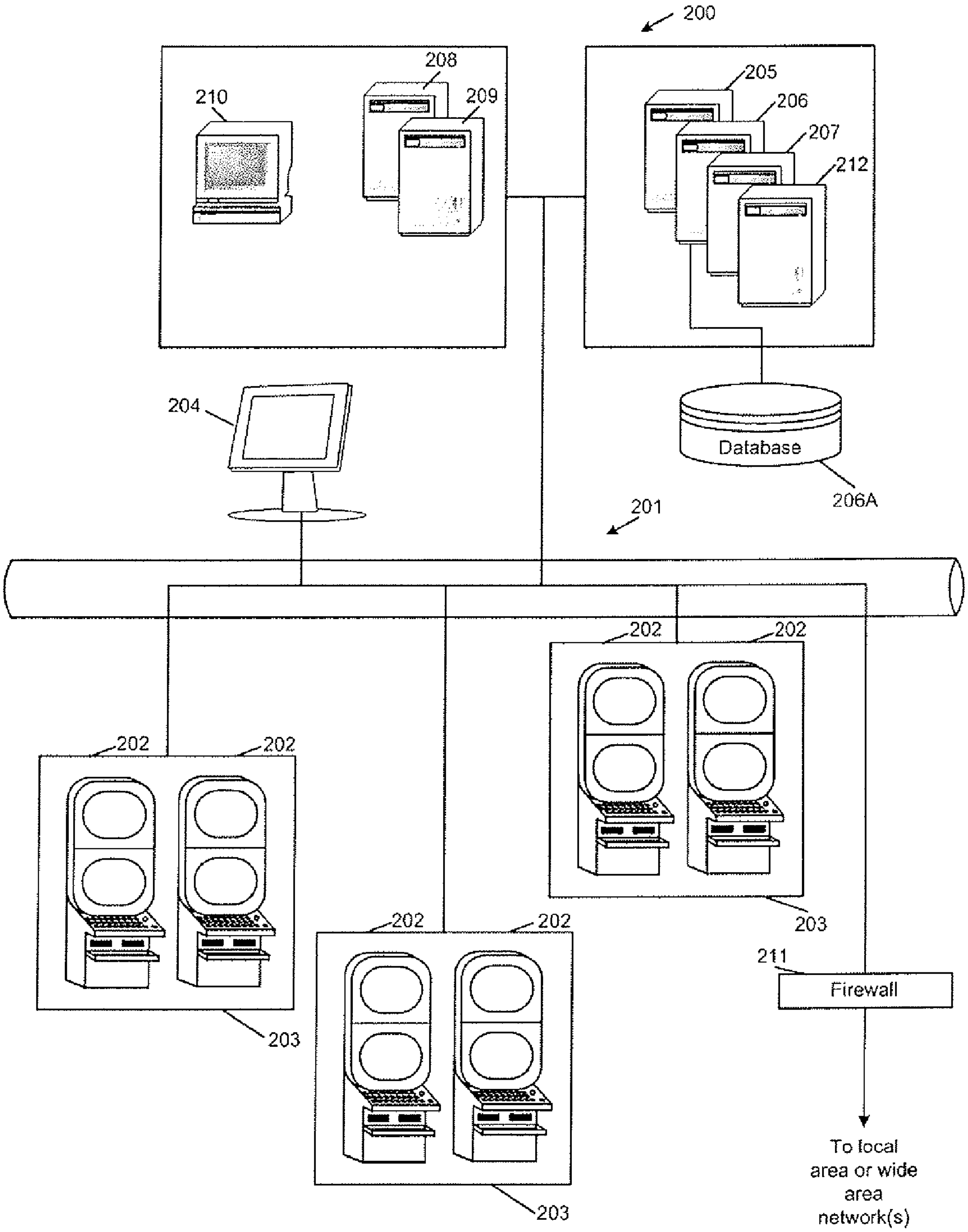
FIG. 6 is a schematic diagram of a gaming system in accordance with an alternative embodiment of the present invention with the gaming system implemented over a network.

FIG. 6 shows a gaming system 200 in accordance with an alternative embodiment. The gaming system 200 includes a network 201, which for example may be an Ethernet network, a LAN or a WAN. In this example, three banks 203 of two gaming machines 202 are connected to the network 201. The gaming machines 202 provide a player operable interface and may be the same as the gaming machines 40,100 shown in FIGS. 3 and 4, or may have simplified functionality depending on the requirements for implementing game play. While banks 203 of two gaming machines are illustrated in FIG. 6, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, a game server 205 implements part of the game played by a player using a gaming machine 202 and the gaming machine 202 implements part of the game. With this embodiment, as both the game server 205 and the gaming machine 202 implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to monitor and carry out the Jackpot game.

In a variation of the above thick client embodiment, the gaming machine 202 may implement the game, with the game server 205 functioning merely to serve data indicative of a game to the gaming machine 202 for implementation.

With this implementation, a data signal containing a computer program usable by the client terminal to implement the gaming system may be transferred from the game server to the client terminal, for example in response to a request by the client terminal.

In a thin client embodiment, the game server 205 implements most or all of the game played by a player using a gaming machine 202 and the gaming machine 202 essentially provides only the player interface. With this embodiment, the game server 205 provides the game controller. The gaming machine will receive player instructions, and pass the instructions to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming system 200, including for example a gaming floor management server 208 and a licensing server 209 to monitor the use of licenses relating to particular games. An administrator terminal 210 is provided to allow an administrator to monitor the network 201 and the devices connected to the network.

The gaming system 200 may communicate with other gaming systems, other local networks such as a corporate network, and/or a wide area network such as the Internet, for example through a firewall 211.

A loyalty program server 212 may also be provided.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random number generator engine. Alternatively, a separate random number generator server could be provided.

During operation, the game controller, whether implemented in a stand alone gaming machine 10, 40, 100 or over a network 201, implements a probabilistic game wherein at least during part of the game the gaming system displays at at least some display positions a win line element and defines a special win line if the displayed win line elements align so as to define a continuous win line extending across the display area, in this example left to right across the display area.

Examples of specific implementations of the gaming system will now be described in relation to a stand alone gaming machine 10, 40, 100 although it will be understood that implementation may also be carried out using other gaming system architectures such as a network architecture of the type shown in FIG. 6.

In one embodiment, the gaming system operates in normal game mode and, when a trigger condition occurs, in special game mode.

During normal game mode, reels including standard symbols and optionally one or more function symbols are provided. Win outcomes are determined on the basis of the symbols visible when the reels stop rotating, and in this example three symbols are displayed on each reel at any time. A win outcome may occur based on display of the same symbol along normal win lines which may extend horizontally diagonally, or in any other predefined continuous line. A win outcome may also occur based on display of multiple scattered symbols at any display location. A win outcome may also occur on the basis of one or more standard symbols in combination with at least one function symbol having an assigned function. For example a function symbol may correspond to a wild function, a scatter function, a multiply function, a repeat win function, and so on.

During special game mode, at least one special win line in addition to the normal win lines may be defined when win line elements associated with at least some of the displayed symbols align so as to define a continuous line extending across the display area.

The gaming system may be arranged to commence special game mode when a predetermined game outcome occurs, or may be prompted by a player pressing a button on the gaming system 10, 40, 100 after the player has identified that a game outcome corresponding to special game mode requirements has occurred. For example, special game mode may commence when a specific combination of symbols is displayed such as scattered CAT symbols.

The gaming system 10, 40, 100 may also be arranged so as to determine eligibility for special game mode, for example based on the amount or type of bet placed, based on certain time periods and so on.

Special game mode may also be arranged to commence when a special game is purchased by a player.

Figure 7:
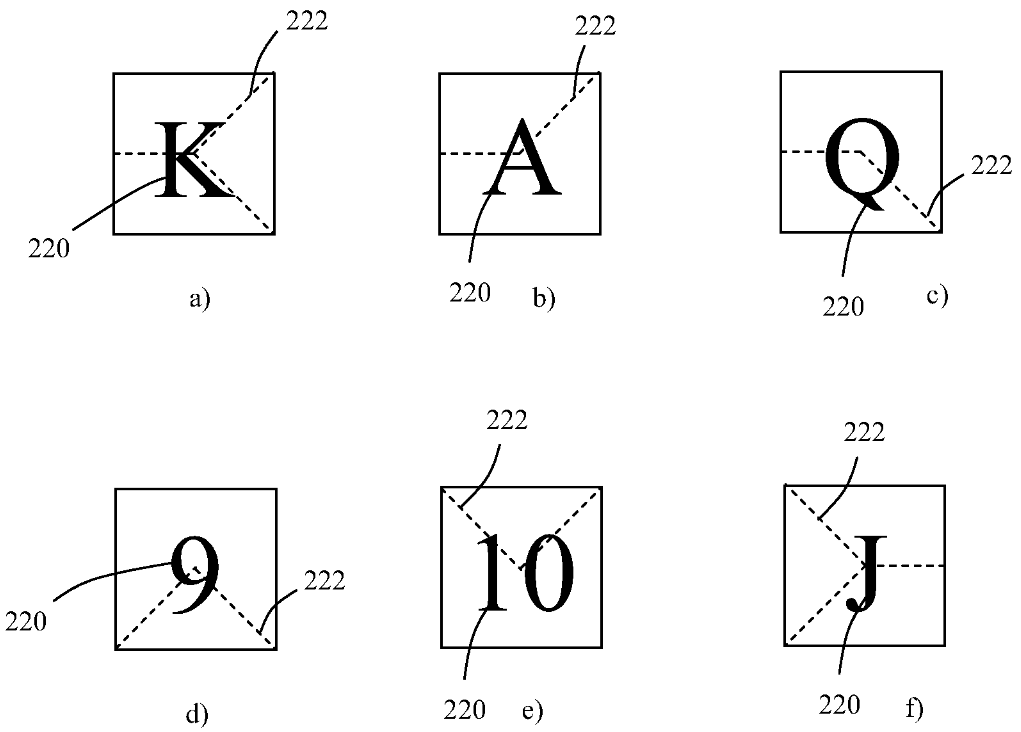
FIGS. 7*a* to 7*f* are representations of symbols of a gaming system in accordance with an embodiment of the present invention, with the symbols including incorporated win line elements.

In one embodiment, as shown in FIG. 7, each symbol 220 is associated with a particular win line element 222, with each win line element 222 being displayed whenever the symbol 220 associated with the win line element 222 is displayed in the display area, or each win line element being displayed only when the symbol 220 associated with the win line element 222 is displayed in the display area and special game mode has commenced.

As shown in FIG. 7, different configurations of win line elements 222 are used so as to provide multiple permutations for special win lines which may be defined by the win line elements 222.

Figure 8:
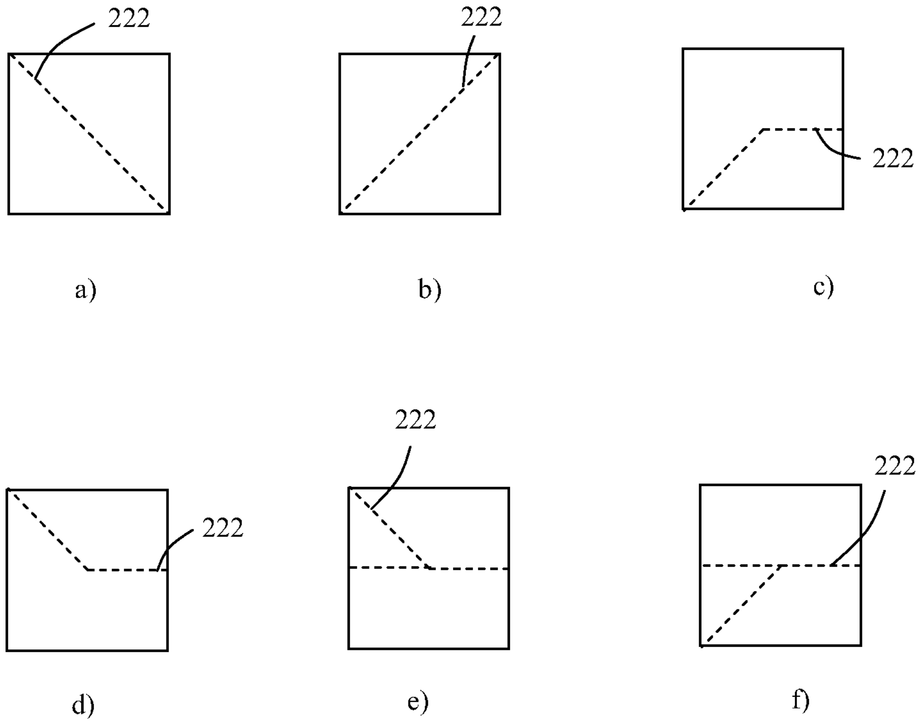
FIGS. 8*a* to 8*f* are representations of win line elements of a gaming system in accordance with an alternative embodiment of the present invention, with the win line elements independent of the symbols.

In an alternative embodiment, as shown in FIG. 8, each win line element 222 is not bound to a particular symbol 220 and, instead, the win line elements 222 are randomly selected independently of the symbols, and superimposed over randomly selected symbols 220. For example, five symbol reels may be provided with each reel being randomly stopped so as to display three symbols, and five win line element reels may be provided and randomly stopped so as to display three win line elements on each reel over the three symbols. In a further example, the win line elements are not associated with reels and are instead selected randomly or in accordance with game rules for display at the display positions from a pool of available win line elements.

The plurality of win line elements may be selected simultaneously. Alternatively, the win line elements may be selected consecutively, or groups of win line elements may be selected consecutively, such that the number of win line elements on the display progressively increases. In the latter variations, each additional win line element or group of win line elements may be selected between spins of symbol reels, with the win line element selection process being dependent on the outcome of each symbol reel spin.

Figure 9:
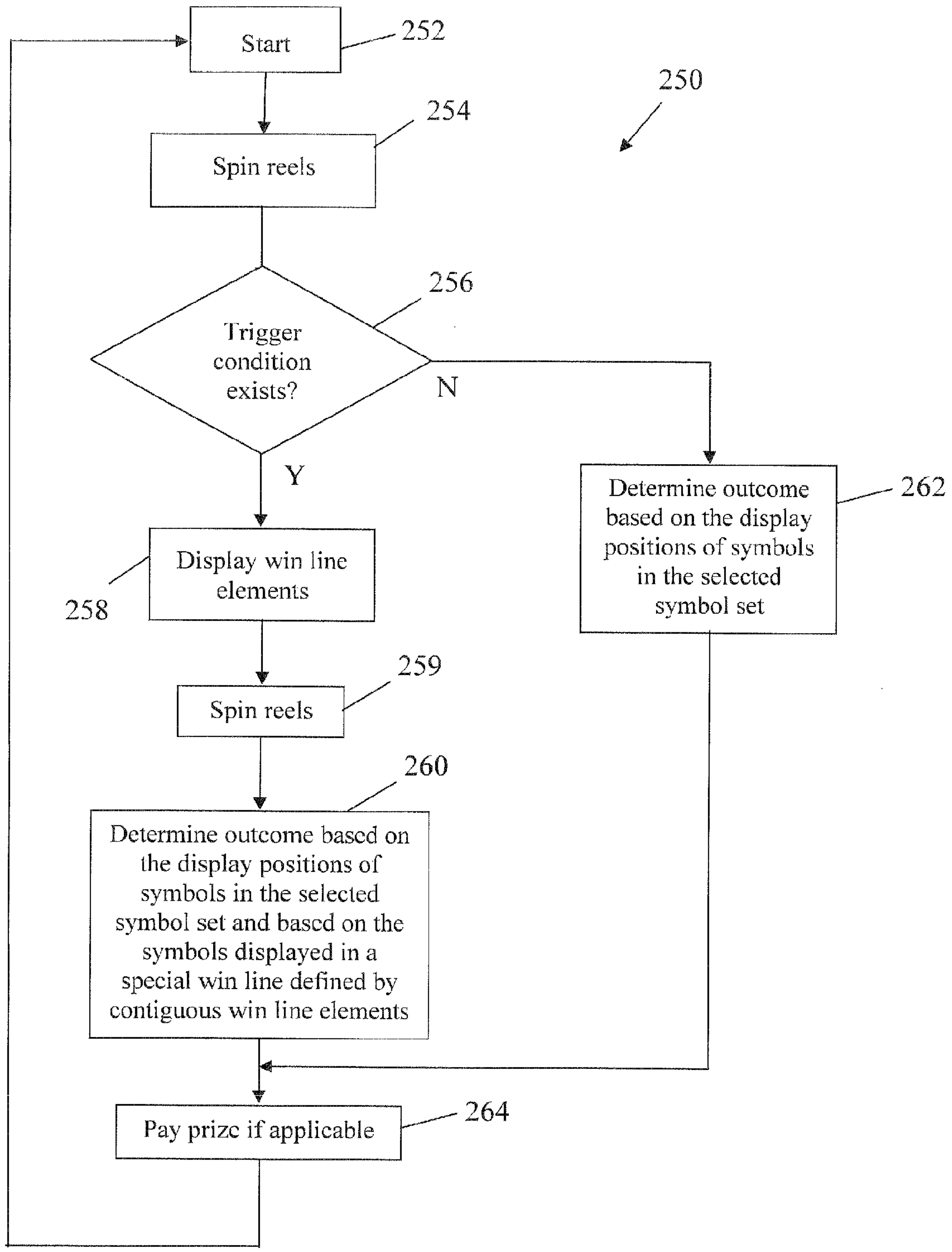
FIG. 9 is a flow diagram illustrating game play of a gaming system in accordance with an embodiment of the present invention.

A specific example will now be described in relation to flow diagram 250 shown in FIG. 9 which illustrates steps 252 to 264 of a method of gaming implemented by the gaming system.

In this example, five reels are provided, with each reel having multiple symbols. The reels are virtual reels and, as such, representations of the reels are displayed on a graphical display device 44.

In this embodiment, each symbol 220 is associated with a win line element 222, although win line elements 222 are only displayed during special game mode.

Figure 10:
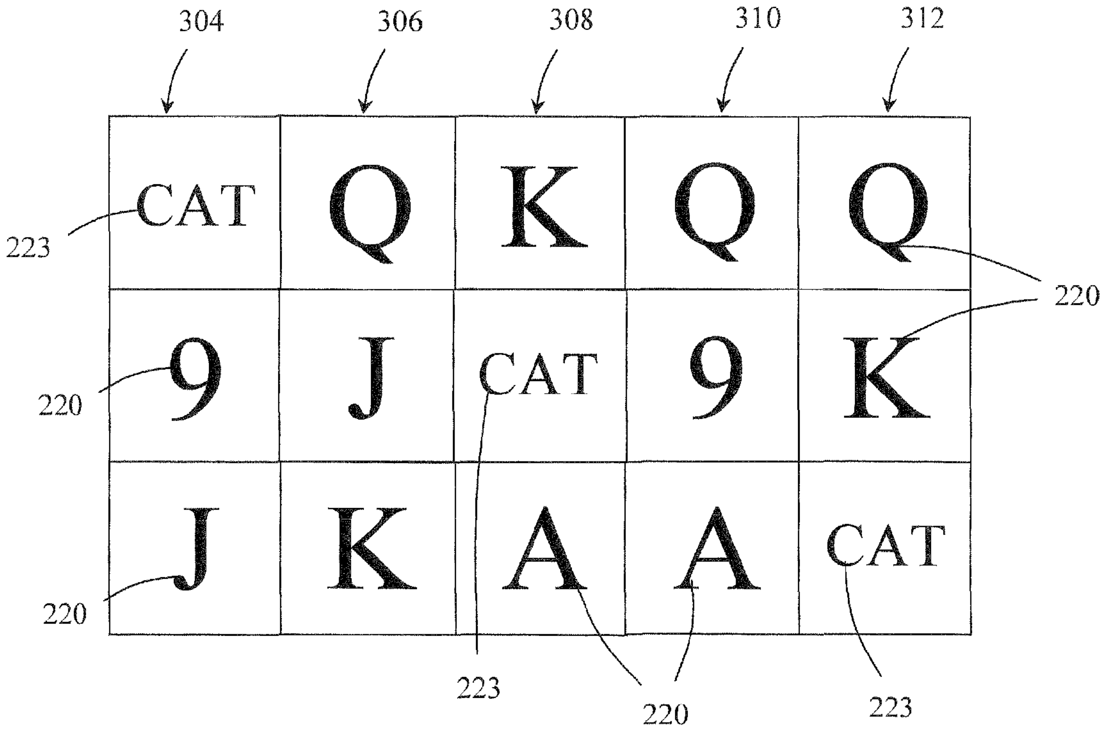
FIG. 10 is a diagrammatic representation of example displayed symbols of a gaming system in accordance with an embodiment of the present invention during implementation of a normal mode of a game.

During normal game mode, first, second, third, fourth and fifth reels 304, 306, 308, 310 and 312 rotate and the reels stop with three symbols 220 displayed on each reel, as shown in FIG. 10. Although each displayed symbol 220 has an associated win line element 222, the win line elements 222 do not affect game outcomes during normal game mode and in this example are not displayed.

The outcome generator 28 evaluates the displayed symbol combination and if the display positions of the symbols correspond to a win outcome a prize is awarded.

In the present embodiment, no win outcome is present.

When a particular trigger condition occurs during normal game mode, for example based on occurrence of a predetermined trigger symbol or symbol combination, by a player pressing a button after the player has identified that requirements for special game mode have been met, or in any other way, the gaming system 10, 40, 100 implements special game mode. Commencement of special game mode may be communicated to a player in any suitable way, for example by displaying an icon on the graphical display.

In the present example, 3 scattered CAT symbols 223 shown on the display triggers special game mode.

Figure 11A:
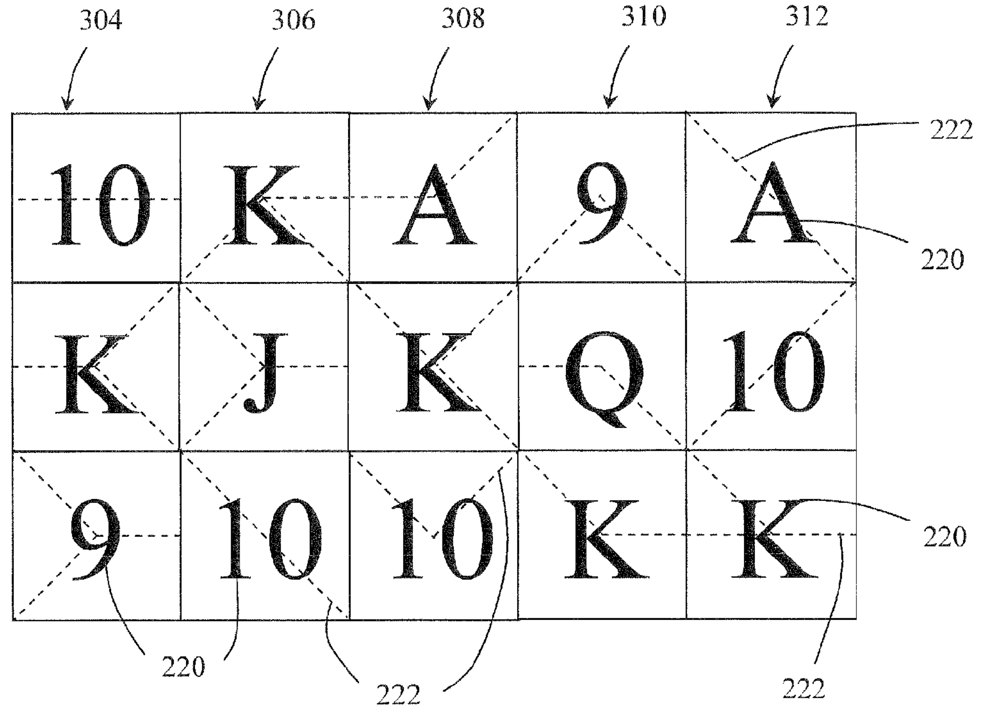
FIG. 11*a* is a diagrammatic representation of example displayed symbols of a gaming system in accordance with an embodiment of the present invention during implementation of a special mode of a game.

During special game mode, as shown in FIG. 11*a*, the symbols 220 and the win line elements 222 are displayed, and the reels are spun and subsequently stopped.

Figure 11B:
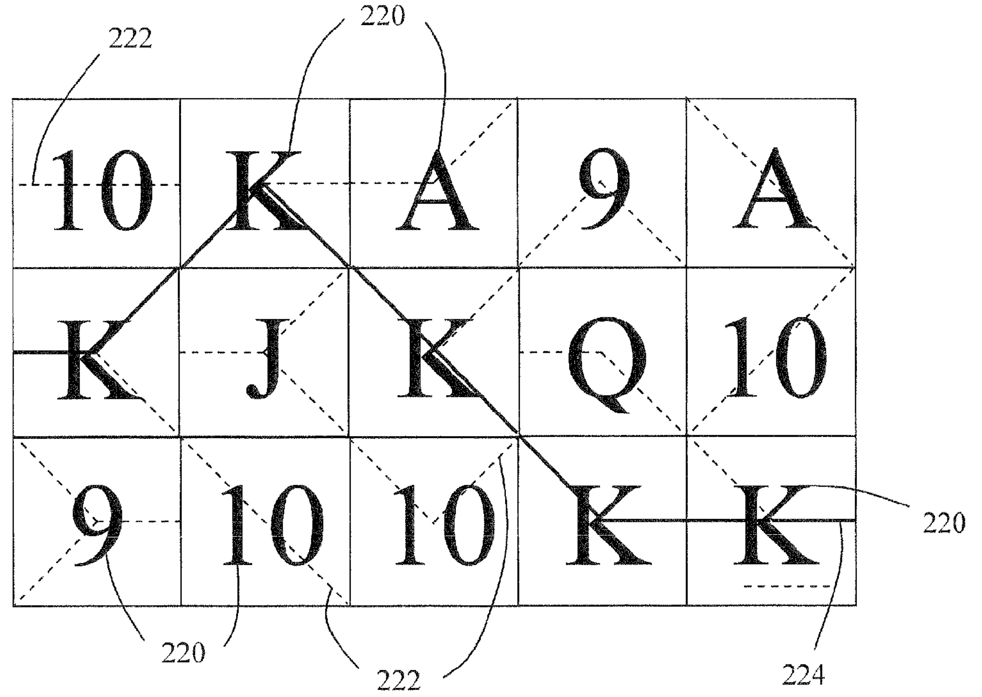
FIG. 11*b* is a diagrammatic representation of the example displayed symbols shown in FIG. 11*a* and showing a special win line constituted by multiple win line elements.

The displayed symbols 220 and win line elements 222 are shown in FIG. 11*a* and, as shown in FIG. 11*b*, the win line elements combine to form a special win line extending left to right across the display area. The special win line 224 in this example corresponds to a win outcome including five King symbols and a prize for five King symbols is awarded.

In an alternative embodiment, instead of each symbol 220 having an associated win line element 222, the symbols 220 and win line elements 222 are independent of each other and separately selected, in this example by providing five reels containing the symbols 220 and five reels containing the win line elements 222. The symbol reels and win line element reels may be virtual reels and, as such, selected symbols 220 and win line elements 222 may be combined and displayed by appropriately controlling the processor 39. Alternatively, where physical reels are used, the win line element reels may be transparent and disposed over the symbol reels.

Figure 12:
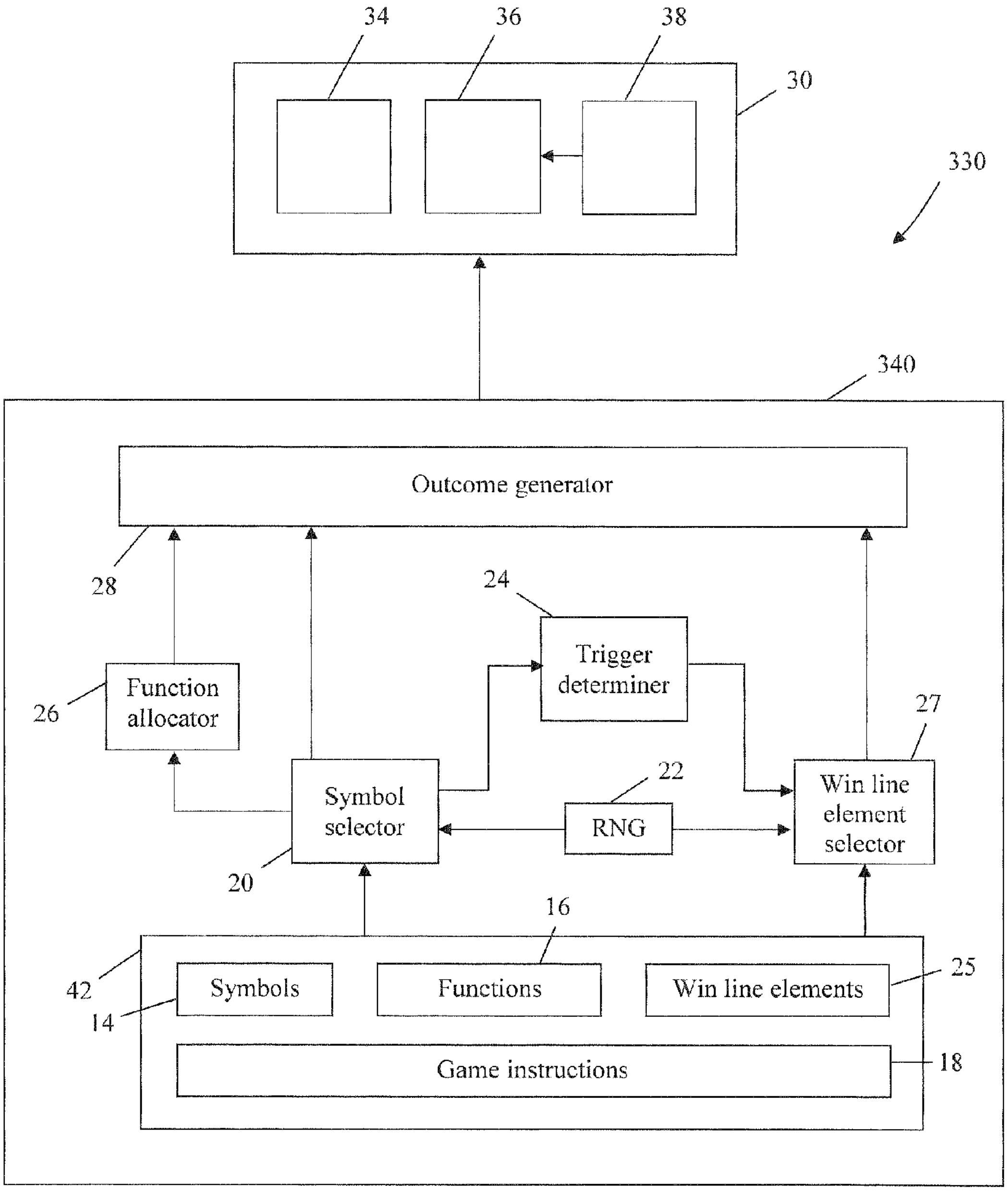
FIG. 12 is a schematic block diagram of functional components of a gaming system in accordance with an alternative embodiment of the present invention.

A functional diagram illustrating an alternative gaming system 330 including operative components of an alternative game controller 340 is shown in FIG. 12. Like and similar features are indicated with like reference numerals.

The game controller 340 is similar to the game controller 32 shown in FIG. 2 except that separate win line elements data 25 is stored in the memory 42 and a win line element selector 27 is included to select win line elements from the stored win line elements 25 for display to a player during special game mode.

Figure 13:
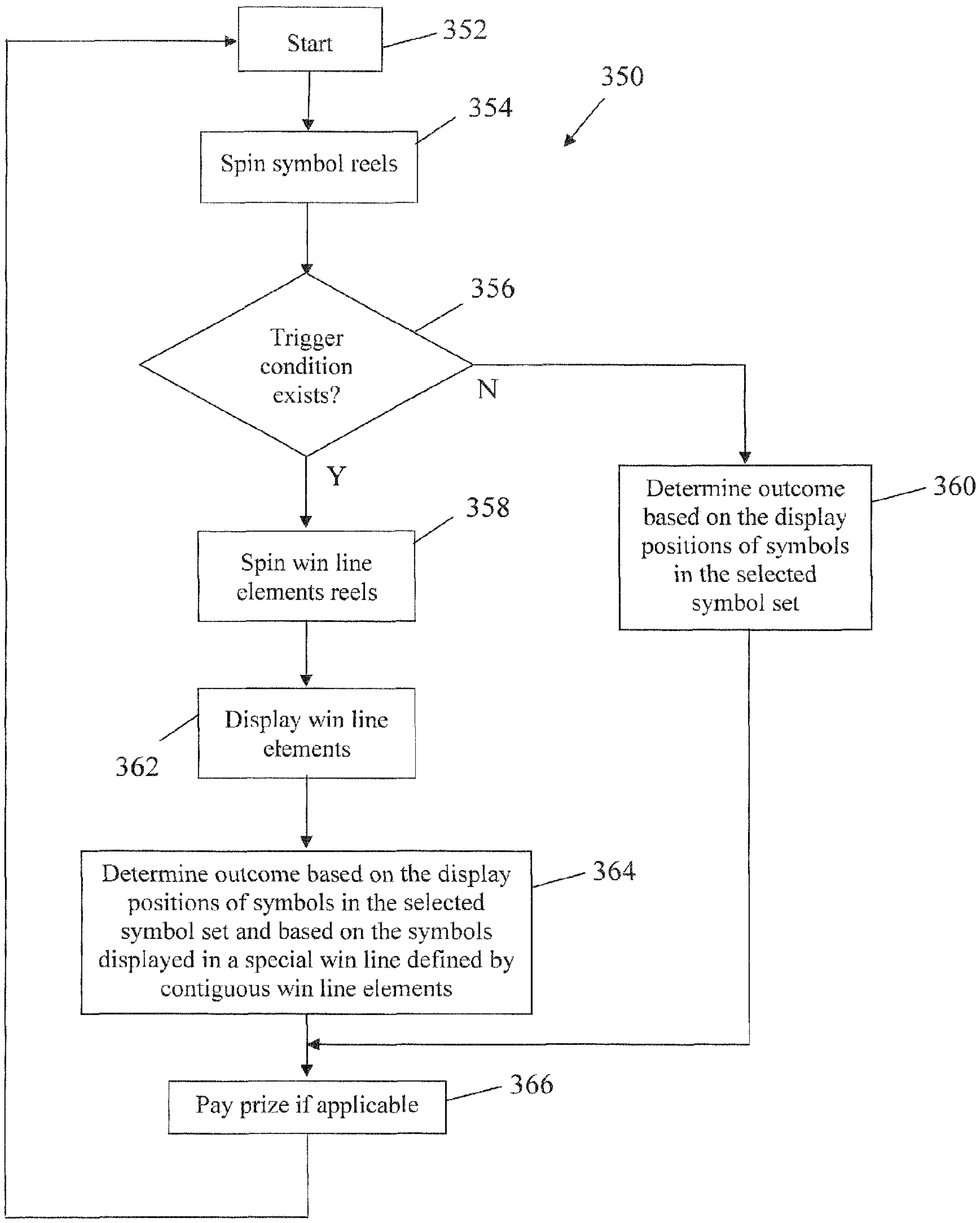
FIG. 13 is a flow diagram illustrating game play of the gaming system shown in FIG. 12.

A specific example of this embodiment is described in relation to flow diagram 350 shown in FIG. 13 which illustrates steps 352 to 366 of a method of gaming implemented by the gaming system shown in FIG. 12.

In this example, five symbol reels are provided, with each reel having multiple symbols. The symbol reels are virtual reels and, as such, representations of the symbol reels are displayed on a graphical display device 44. Five win line element reels are also provided, with each win line element reel having multiple win line elements. The win line element reels are virtual reels and, as such, representations of the win line element reels are displayed on the graphical display device 44.

During normal game mode, first, second, third, fourth and fifth symbol reels rotate and the symbol reels stop with three symbols 220 displayed on each symbol reel. The win line elements on the win line element reels are not displayed.

The outcome generator 28 evaluates the displayed symbol combination shown on the graphical display device 44 and if the displayed positions of the symbols correspond to a win outcome a prize is awarded.

When special game mode has been triggered, for example as discussed above in relation to the embodiment described with reference to FIG. 9, the win line element reels are displayed, spun and subsequently stopped to show selected win line elements over the already selected symbols.

If the displayed win line elements together define a new special win line, the symbols appearing along the special win line are evaluated to determine whether a win outcome exists.

As an alternative to the present embodiment, after commencement of special game mode, both the symbol reels and the win line element reels may be spun and subsequently stopped.

As a further alternative, instead of displaying a win line element at each display position, the gaming system may be arranged so that at least for some situations only some display positions include win line elements, which may be selected randomly, in accordance with game rules or in any other way.

In the claims of this application and in the description of the invention, except where the context indicates otherwise due to express language or necessary implication, the words “comprise” or variations such as “comprises” or “comprising” are used in an inclusive sense, i.e. to specify the presence of the stated features but not to preclude the presence or addition of further features in various embodiments of the invention.

Modifications and variations as would be apparent to a skilled addressee are deemed to be within the scope of the present invention.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive. Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any electronic device and/or machine-readable media suitable for accomplishing its operations. Certain embodiments of the present invention may be implemented using an existing computer processor and/or by a special purpose computer processor incorporated for this or another purpose or by a hardwired system, for example Embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Method steps associated with certain embodiments may be implemented in one embodiment by a program product including machine-executable instructions, such as program code, for example in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represents examples of corresponding acts for implementing the functions described in such steps.

The invention claimed is:

1. A gaming system comprising:

a display area configured to display a game;

a credit input mechanism configured to receive a credit input from a player of the game;

a selector configured to:

select a plurality of symbols from a set of symbols for display on the display area at a plurality of display positions, and select a plurality of win line elements for display on the display area at one or more of the plurality of display positions, each win line element including a win line portion of a special win line;

an outcome generator configured to:

determine whether the displayed win line portions align to define a contiguous special win line across the display area, and determine, if the displayed win line portions align to define a contiguous special win line, a game outcome based on symbols displayed at the respective display positions of the aligned win line portions along the contiguous special win line; and a payout dispenser configured to distribute a payout to the player based on the game outcome.

2. A gaming system as claimed in claim 1, wherein the selector is further configured to select the plurality of win line elements simultaneously.

3. A gaming system as claimed in claim 1, wherein the selector is configured to select at least some of the plurality of win line elements consecutively such that a number of win line elements displayed on the display area progressively increases.

4. A gaming system as claimed in claim 1, wherein each selected win line element of the plurality of win line elements is associated with a symbol of the set of symbols such that selection of a symbol of the plurality of symbols by the selector effects selection of an associated win line element.

5. A gaming system as claimed in claim 1, wherein the selector comprises a symbol selector and a win line elements selector such that the plurality of win line elements are selectable independently of the plurality of symbols.

6. A gaming system as claimed in claim 1, wherein the gaming system is operable in a normal game mode and a special game mode, and the plurality of win line elements are displayed only during the special game mode.

7. A gaming system as claimed in claim 6, wherein during the normal game mode, the selector is further configured to:

select a first plurality of symbols for display at a first plurality of display positions, select, after commencement of the special game mode, a second plurality of symbols for display at a second plurality of display positions, and select the plurality of win line elements.

8. A gaming system as claimed in claim 6, wherein the selector comprises a symbol selector and a win line elements selector such that the win line elements are selectable independently of the plurality of symbols, and wherein after commencement of special game mode, the selector is further configured to:

select the plurality symbols for display at the plurality of display positions, and subsequently select the plurality of win line elements for display at the plurality of display positions.

9. A gaming system as claimed in claim 6, wherein the selector is further configured to select the plurality of win line elements for display at the plurality of display positions at the same time as selection of the plurality of symbols.

10. A gaming system as claimed in claim 1, wherein when the contiguous special win line is defined by the plurality of win line elements, the contiguous special win line is emphasized to a player of the game.

11. A gaming system as claimed in claim 10, wherein the contiguous special win line is emphasized to the player by displaying an emphasized line extending along the defined contiguous special win line.

12. A gaming system as claimed in claim 1, wherein the outcome generator is further configured to:

determine whether a plurality of contiguous special win lines are defined by the displayed win line portions, and determine the game outcome based on symbols displayed along each contiguous special win line of the plurality of contiguous special win lines.

13. A gaming system as claimed in claim 1, wherein the gaming system is configured to commence a special game mode when a trigger condition is satisfied.

14. A gaming system as claimed in claim 13, wherein the trigger condition includes at least one of: display of at least one trigger symbol, display of a particular combination of trigger symbols, and display of a particular combination of adjacently disposed symbols along a predefined win line.

15. A gaming system as claimed in claim 1, wherein the gaming system is implemented as a stand alone gaming machine or across a network.

16. A gaming system as claimed in claim 1, wherein the selector is further configured to select a win line element for each display position of the plurality of display positions.

17. A gaming system as claimed in claim 1, wherein the selector is further configured to select a win line element for some but not all of the plurality of display positions.

18. A method of gaming implemented using a gaming machine including a display area configured to display a game, a credit input mechanism configured to receive a credit input from a player of the game, a selector, an outcome generator, and a payout dispenser configured to distribute a payout to the player based on a game outcome of the game, said method comprising:

selecting, using the selector, a plurality of symbols from a set of symbols for display on the display area at a plurality of display positions;

displaying the plurality of symbols on the display area at the plurality of display positions;

selecting, using the selector, a plurality of win line elements for display on the display area at one or more of the plurality of display positions, each win line element including a win line portion of a special win line;

displaying the plurality of win line elements including the win line portions on the display area at the one or more of the plurality of display positions;

determining, using the outcome generator, whether the displayed win line portions align to define a contiguous special win line across the display area; and determining, using the outcome generator, if the displayed win line portions align to define a contiguous special win line, a game outcome based on symbols displayed at the respective display positions of the aligned win line portions along the contiguous special win line; and distributing, using the payout dispenser, a payout to the player based on the determined game outcome.

19. A method as claimed in claim 18 further comprising selecting, using the selector, the plurality of win line elements simultaneously.

20. A method as claimed in claim 18 further comprising selecting, using the selector, at least some of the plurality of win line elements consecutively such that a number of win line elements displayed on the display area progressively increases.

21. A method as claimed in claim 19 further comprising associating, using the selector, each selected win line element of the plurality of win line elements with a symbol of the set of symbols such that selection of a symbol of the plurality of symbols by the selector causes selection of the associated win line element.

22. A method as claimed in claim 18 further comprising selecting the plurality of win line elements independent of the plurality of symbols.

23. A method as claimed in claim 18 further comprising:

providing, using the selector, a normal game mode and a special game mode; and displaying, on the display area, the plurality of win line elements only during the special game mode.

24. A method as claimed in claim 23 further comprising:

selecting, using the selector during the normal game mode, a first plurality of symbols for display at a first plurality of display positions;

selecting, using the selector after commencement of the special game mode, a second plurality of symbols for display at a second plurality of display positions; and selecting, using the selector, the plurality of win line elements.

25. A method as claimed in claim 23 further comprising:
selecting, using the selector, the plurality of win line elements independently of the plurality of symbols;
selecting, using the selector after commencement of the special game mode, the plurality of symbols for display at the plurality of display positions; and
subsequently selecting, using the selector, the plurality of win line elements for display at the plurality of display positions.

26. A method as claimed in claim 23 further comprising selecting the plurality of win line elements for display at the plurality of display positions at the same time as selection of the plurality of symbols.

27. A method as claimed in claim 18 further comprising emphasizing, on the display area, the contiguous special win line.

28. A method as claimed in claim 18 further comprising:
determining, using the outcome generator, whether a plurality of contiguous special win lines are defined by the displayed win line portions, and
determining, using the outcome generator, the game outcome based on symbols displayed along each contiguous special win line of the plurality of contiguous special win lines.

29. A method as claimed in claim 18 further comprising commencing, using the selector, a special game mode when a trigger condition is satisfied.

30. A method as claimed in claim 29 wherein the trigger condition includes at least one of: display of at least one trigger symbol, display of a particular combination of trigger symbols, and display of a particular combination of adjacently disposed symbols along a predefined win line.

31. A method as claimed in claim 18 further comprising selecting, using the selector, a win line element for each display position of the plurality of display positions.

32. A method as claimed in claim 18 further comprising selecting a win line element for some but not all of the plurality of display positions.

33. A non-transitory computer readable medium including a computer program configured, when executed by a gaming system including a processor, to instruct the processor to:
select, using a selector, a plurality of symbols from a set of symbols;
display the plurality of symbols on a display area at a plurality of display positions;
select, using the selector, a plurality of win line elements for display on the display area at one or more of the plurality of display positions, each win line element including a win line portion of a special win line;
display the plurality of win line elements including the win line portions on the display area at the one or more of the plurality of display positions;
determine, using an outcome generator, whether the displayed win line portions align to define a contiguous special win line across the display area; and
determine, using the outcome generator, if the displayed win line portions align to define a contiguous special win line, a game outcome based on symbols displayed at the respective display positions of the aligned win line portions along the contiguous special win line; and
distribute, using a payout dispenser, a payout to a player based on the determined game outcome.

* * * * *